United States Patent [19] [11] 3,686,634
Malchman et al. [45] Aug. 22, 1972

[54] PULSE RATE MONITOR AND INDICATOR SYSTEM UTILIZING A BURST PULSE COUNTER AND A PULSE INTERNAL COUNTER

[72] Inventors: Franklin L. Malchman, Montgomery; William J. Raddi, Philadelphia, both of Pa.

[73] Assignee: ESB Incorporated

[22] Filed: April 2, 1971

[21] Appl. No.: 130,632

[52] U.S. Cl............340/171 R, 235/92 CC, 307/234, 328/109, 340/167 A, 340/206
[51] Int. Cl......................G06m 01/00, H03k 05/20
[58] Field of Search......328/109, 110, 119; 307/232, 307/233, 234; 340/171, 167, 167 A, 168, 164, 206; 325/324, 325; 329/107, 126; 235/92 CC

[56] References Cited

UNITED STATES PATENTS 3,586,835  6/1971  Foeh, Jr. ...............235/92 CC
3,601,706  8/1971  Battle, Jr. .............307/234 X
3,185,963  5/1965  Peterson et al. .......340/168 R
3,518,555  6/1970  Konotchick, Jr. .....307/232 X

OTHER PUBLICATIONS

IBM Technical Disclosure Bulletin, Vol. 6, No. 7, December 1963, pg. 74, 75 " Variable Frequency Missing Pulse Detector" R. L. Adams, Jr.

Primary Examiner—Donald J. Yusko
Attorney—Robert H. Robinson, Raymond L. Balfour, Anthony J. Rossi and Thomas A. Lennox

[57] ABSTRACT

A receiver apparatus adapted to have coupled thereto intentionally transmitted signals, each being characterized as having a predetermined number of pulsations, which are transmitted over a communication link such as the standard switched telephone network and, at times, noise signals which are introduced into the communication link. The receiver includes measuring means arranged to measure the time interval between successive signals coupled thereto, and signal verification means to verify that each signal coupled to the receiver is either an intentionally transmitted signal or a noise signal. In the event that a noise signal is coupled to the receiver, the signal verification means is arranged to abort measurements of the measuring means. Measurements not aborted are indicative of the time interval between each two successive intentionally transmitted signals coupled to the receiver.

9 Claims, 2 Drawing Figures

Patented Aug. 22, 1972

INVENTORS.
FRANKLIN L. MALCHMAN
WILLIAM J. RADDI

PULSE RATE MONITOR AND INDICATOR SYSTEM UTILIZING A BURST PULSE COUNTER AND A PULSE INTERNAL COUNTER

BACKGROUND OF THE INVENTION

1. Field of the Invention

This invention relates to receiver apparatus. More particularly, the invention concerns novel receiver apparatus which may form a part of a monitor apparatus which in turn, can be used to provide information or indicate to an observer, and/or record the state or condition of the power supply, generally comprising a battery, supplying electrical energy to an organ stimulator; such information or indication being derived from the rate of operation of the organ stimulator.

2. Description of the Prior Art

By the way of background, it may be explained that electronic heart pacers are used in the treatment of heart block. Simply stated, heart block occurs when the natural periodic electric stimulation signals generated on a portion of the heart, the atrium, are for some reason partially or wholly blocked or prevented from reaching another portion of the heart, the ventricle. Because of the blockage, the ventricle does not function, at all if the block is complete, or pump at the proper time or at the proper rate if the block is partial.

Essentially, an electronic heart pacer is a device used to overcome or treat heart block. In recent times, the electronic pacers have been miniaturized and are now wholly implanted within the body, usually just below the level of the skin. Implanted pacers are usually self-contained and powered by battery. The pacers generate electric stimulation pulses which are then applied via a flexible lead or leads, to the heart. The generated electric pulses, i.e., artificial stimulation signals, when applied to the heart, simulate the natural periodic electric stimulation signals generated on the atrium and result in the ventricle pumping at the proper time and rate as in normal situations. Generally, the heart is electrically stimulated to beat once for each pulse that is generated by the pacer and received at the heart.

There are three broad categories into which most commercial pacers fall, namely, the synchronous types, the asynchronous types and the inhibited or standby types. The synchronous types are also sometimes referred to as "triggered" pacers in that their operation is effected by a signal derived from body activity which is sensed and fed back to the pacer to trigger its operation; the derived trigger signal usually being the presence or absence of either atrial or ventricular activity. The asynchronous types are also sometimes referred to as "non-triggered" in that they do not respond in any way to body activity; they operate at a fixed rate. The inhibited or standby types under normal cardiac activity do not produce stimulation pulses, however, if spontaneous rhythm is not sensed within a predetermined time interval, as for example, 1 second, then the pacer delivers a stimulating pulse, and continues to deliver pulses until normal heart rhythm is restored.

Most triggered pacers and most inhibited or standby pacers contain a magnetic switch which can be externally activated to convert the pacer to asynchronous or non-triggered operation.

As stated above, pacers are usually powered by batteries. The batteries best suited for powering pacers normally maintain a substantially constant voltage throughout their lives, and then, near the end of their lives run down over a relatively short period of time. Generally, toward the end of life of the batteries of a pacer operating, or caused to operate in a non-triggered mode, the pulse rate thereof decreases (the output pulse interval increases) and consequently, the heart beats slower. There is a type of pacer, however, in which the pulse rate increases with a decrease in battery voltage. In addition to changes in pulse rate due to battery exhaustion, a pacer's pulse rate may change due to physiological conditions or due to malfunction of conditions pacer.

It is, of course, important that changes in the pulse rate of a pacer, after implant, be detected at the earliest possible time in order that the cardiologist treating the patient may take appropriate measures to safeguard the life of the patient, as for example, he may consider that replacement of the pacer is called for when the pulse rate of the pacer falls to some predetermined rate or departs significantly up or down from the rate determined or set at the time of implantation.

From the foregoing, it will be understood that an indication of the condition or state of the power supply or battery of a pacer operating, or caused to operate, in a non-triggered mode may be had by determining the time interval between two successive pulses of the pacer. Consequently, it has become desirable to provide an apparatus that would monitor the pulse rate of a pacer and as the pulse interval of the pacer changes, due to a defective battery, or the critical period of rapid decline in battery voltage near the end of its life, or for any other reason, to give an indication of such a change in pulse interval. Such an apparatus would provide the cardiologist with an effective means to monitor and ascertain the performance or condition of the battery or batteries of the pacer. Even more desirable would be apparatus that can be adapted to perform such functions from outside the body and from a remote location in order that it not be required that the patient make frequent trips to the office of the cardiologist.

Such apparatus has in fact been recently developed. See the abstract entitled Transtelephone Pacemaker Clinic by S. Furman, B. Parker, and D. Escher, published in the American Journal of Cardiology, Volume 25, page 94. The abstract cited does not go into details of the apparatus used for the monitoring of a patient's implanted heart pacer via telephone lines, however, the apparatus used is known to the present inventors and comprises a transducer situated with the patient, usually in his home, and a receiver coupled to an electronic interval counter located at some central office, laboratory or hospital. Each pacer output pulse is detected or sensed by the transducer at the patient's hands and converted to an audible signal which is acoustically coupled to the patient's telephone handset for transmission to another telephone handset at the receiver location. The received audible signals are converted to short electrical pulses by the receiver and the receiver delivers these electrical output pulses to the electronic counter. The counter is adapted to provide a display of the time interval, in milliseconds (ms), between received signals. The time interval between received signals provides an indication to an observer or personnel at the receiver location of the voltage state of the batteries of the pacer being monitored. More particularly, the time between received signals is compared to previously received or recorded data compiled over a period of time and the degree of change is then used as an indication of the state of the batteries of the pacer. The received data may, of course, be used for other diagnostic purposes.

In the prior art apparatus just described, the sensed pacer output pulses were converted by the transducer to audible signals which may be characterized as short bursts of sound or clicks. These clicks were then transmitted over the standard telephone network to the receiver location. At the receiver location, the time interval between clicks was then measured by an interval counter. At times, telephone line noise masked these clicks, interfered with the measurements, and produced erratic results so that a considerable amount of practical judgment was required on the part of the operator, located at the receiver location, to obtain consistent and reliable readings. Often, a reading was obtained only because the operator had some prior knowledge of the value of time interval to be measured. At times, due to telephone line noise, it was impossible to obtain any reading whatsoever. Manipulating gain controls on the receiver could only partially mitigate the effects of telephone line noise. Again, operator experience was required to properly adjust these gain controls as well as the various controls of the interval counter.

Another problem in the prior art monitor apparatus described was manifested in the transducer used to sense the pacer output pulses. The transducer was susceptible to ambient electrical fields such as produced by fluorescent lights, electric razors, DC electric motors, or even the proximity of a 60 cycle current carrying wire. This susceptibility resulted in the introduction of spurious clicks onto the telephone line, a situation which is completely intolerable for accurate time interval measurements of the type described.

SUMMARY OF THE INVENTION

Many of the problems associated with the prior art monitor apparatus described have been eliminated by modifying the monitor apparatus and adapting the transducer of the monitor apparatus to convert the sensed pacer pulses to audible tone bursts of predetermined frequency and duration. The reader is referred to a copending application Ser. No. 118,144 filed Feb. 23, 1971, assigned to the assignee of the instant application wherein a more complete description of a monitor apparatus and the novel transducer thereof is set forth. For the present discussion, however, it is only necessary to understand that with each pacer output pulse the transducer disclosed in the referred to application emits, not a click, but a tone burst, approximately 50 ms in duration and with a frequency of 2KHz, hereinafter sometimes referred to as an intentionally transmitted tone burst signal, and that the novel receiver, in accordance with the present invention, derives valid time interval information between the leading edges of each such two successive tone bursts and rejects interference by impulse noise.

Briefly, there is provided by the present invention a receiver apparatus adapted to have coupled thereto intentionally transmitted signals, each being characterized as having a predetermined number of pulsations, which are transmitted over a communication link, and, at times, noise signals which are introduced into the communication link. The receiver is constructed and arranged to continually sift through all signals coupled thereto to locate each two successive intentionally transmitted signals without any intervening noise signals therebetween for providing information indicative of the time interval between each such two successive intentionally transmitted signals.

A more complete understanding of the invention will be had from the following detailed description taken in connection with the accompanying drawings which form a part of this specification.

DESCRIPTION OF THE PREFERRED EMBODIMENT

Figure 1:
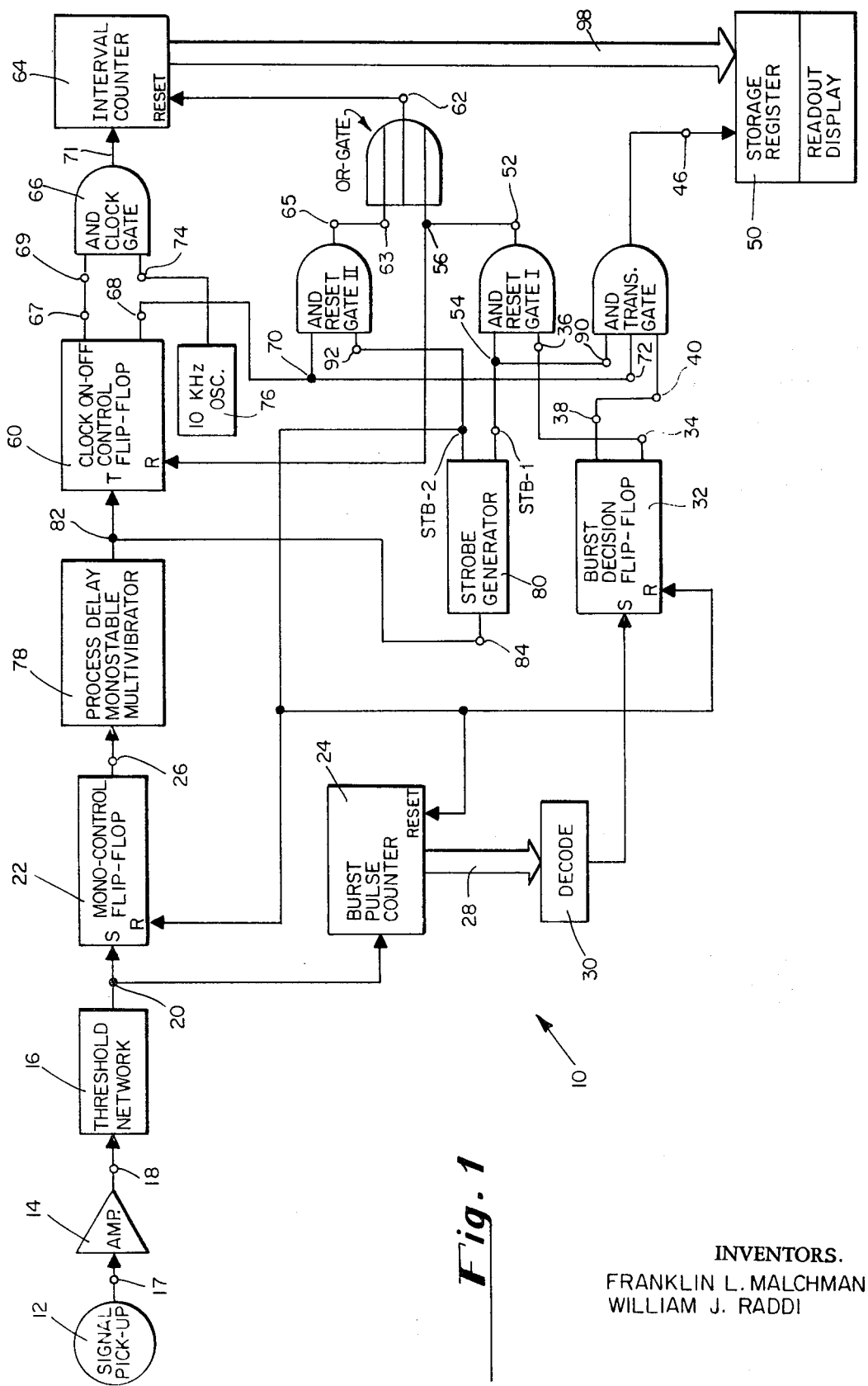
FIG. 1 is a block diagram of the receiver in accordance with the invention.

In order to lay a foundation of the detailed description of the operation of the receiver of the invention which follows hereinafter, a brief description of the general operation of the receiver will first be given, and this will be followed by a brief description of the interconnection of the various components of the receiver. In the latter description, a partial outline of the functions of certain of the components of the receiver will be set forth. The functions of the various components not given in this outline will, however, become evident or appear in the detailed description of the operation of the receiver.

General Description of Operation

It may be further explained here that the receiver of the invention was developed for use in monitor apparatus adapted to monitor electrical stimulation signals due to either natural or artificial electrical stimulation of a body part via a communication link such that the repetition rate of the electrical stimulation signals could be determined. More specifically the receiver of the invention was developed for use in conjunction with the novel transducer means set forth and claimed in the above identified copending application. That novel transducer means, when sensing the output pulses of a cardiac pacer, as for example, emits, not a click, but a tone burst, approximately 50 ms in duration and with a frequency of 2KHz, for each pacer output pulse. The tone bursts are each transmitted over the standard switched telephone network. It is the function of the receiver of the invention to process the received signals and provide information to an observer indicative of the pulse repetition rate of the cardiac pacer whose output pulses are being monitored. More specifically, the receiver of the invention is adapted to have coupled thereto audible signals which are transmitted over a telephone communication link, the audible signals including intentionally transmitted audible signals, i.e., tone bursts approximately 50 ms in duration with a 2KHz frequency, and at times, audible noise signals which are introduced into the communication link. The receiver of the invention is constructed and arranged to continually sift through all signals coupled thereto to locate each two successive intentionally transmitted signals without any intervening noise signals therebetween for providing information indicative of the time interval between each such two successive intentionally transmitted signals and, therefore, provide information indicative of the pulse repetition rate of the cardiac pacer being monitored.

The receiver accomplishes this by means of unique digital techniques. The receiver of this invention derives valid "time interval information" between the leading edges of two successive intentionally transmitted tone burst signals and rejects interference by impulse noise, i.e., non-intentionally transmitted and/or received signals. As for example, when a first signal is received, detection, by the receiver, of the leading edge thereof initiates a time interval measuring process and simultaneously initiates a verification or recognition measurement process to recognize whether or not an intentionally transmitted tone burst signal has been received. If the recognition process is positive, the receiver continues with the time interval measuring process. The leading edge of the next or a second received signal stops the time interval measuring process and begins a second recognition measurement process. If the second recognition measurement process verifies that the next or second received signal is in fact an intentionally transmitted tone burst signal, then the results of the time interval measuring process are displayed. The displayed information may, for example, take the form of the time in milliseconds between the leading edges of the two successive received signals or may be a direct reading of the rate per minute of the received signals.

If however, the second received signal is a noise impulse, the time interval measurement process would again cease, but the second recognition measurement process would not verify that a tone burst had been received. In this situation, the time interval measurement process would be aborted and not displayed. The results of any previous valid time interval measurement would, however, remain displayed.

If the first signal were a noise impulse, the time interval measurement process would have been aborted at the conclusion of the first recognition measurement process.

The receiver, accordingly, continually sifts through all received signals to fine two consecutive intentionally transmitted tone burst signals without intervening noise impulses to perform a valid time interval measurement and automatically rejects time interval measurements arising from any other combination of signals.

Interconnection of the Various Components

In the following description various logic elements are described described. AND and OR gates are well known in the art. An AND gate yields a logic one (1) on its output terminal if all of the input terminals thereof have logic ones applied thereto; a logic zero (0) appears on its output terminal if a logic 0 appears on any of its input terminals. An OR gate yields a logic 1 on its output terminal if a logic 1 is applied to any of its input terminals; a logic 0 appears on its output terminal if all of its input terminals have logic zeros applied thereto. In addition, a number of bistable devices (flip-flops) are employed in the receiver of the invention. The two possible states of the various bistable devices may be represented on the output terminals of the bistable devices as logic ones and zeroes. Depending on the type of bistable device, a signal on its input terminal may or may not change the state of the bistable device; this will be indicated in the description of each bistable device. In both the AND and OR gates and in the bistable devices, ground states usually represent logical zeroes and voltage levels usually represent logical ones.

Referring now to FIG. 1, the receiver in accordance with the invention is shown generally at 10. A signal pick-up means is shown at 12. The signal pick-up 12 is operatively connected to an Amplifier 14. The Signal pic 12 is adapted to be placed adjacent to the earpiece contained in the handset of a standard telephone. Preferably, the Signal Pick-up 12 comprises a magnetic type such that the variations in current which drive the telephone earpiece are magnetically coupled to the Amplifier 14. If desired, the Amplifier 14 may be acoustically coupled to the telephone earpiece via a microphone. The signals appearing on the input terminal 17 of the Amplifier 12 may be generally characterized as approximate sine waves. That is, they are signals varying about a DC reference level; see line 100 of FIG. 2. Pick-up The Amplifier 14 has sufficient gain to accommodate most attenuation looses that can be expected on standard switched telephone network. That is, the Amplifier has sufficient gain to trip the Threshold Network 16 which is connected to the Amplifier 14. The signals appearing on the input terminal 18 of the Threshold Network 16 are substantially identical to those appearing on the input terminal 17 of the Amplifier 14, the level of the signals is, of course, higher; see line 102 of FIG. 2.

Figure 2:
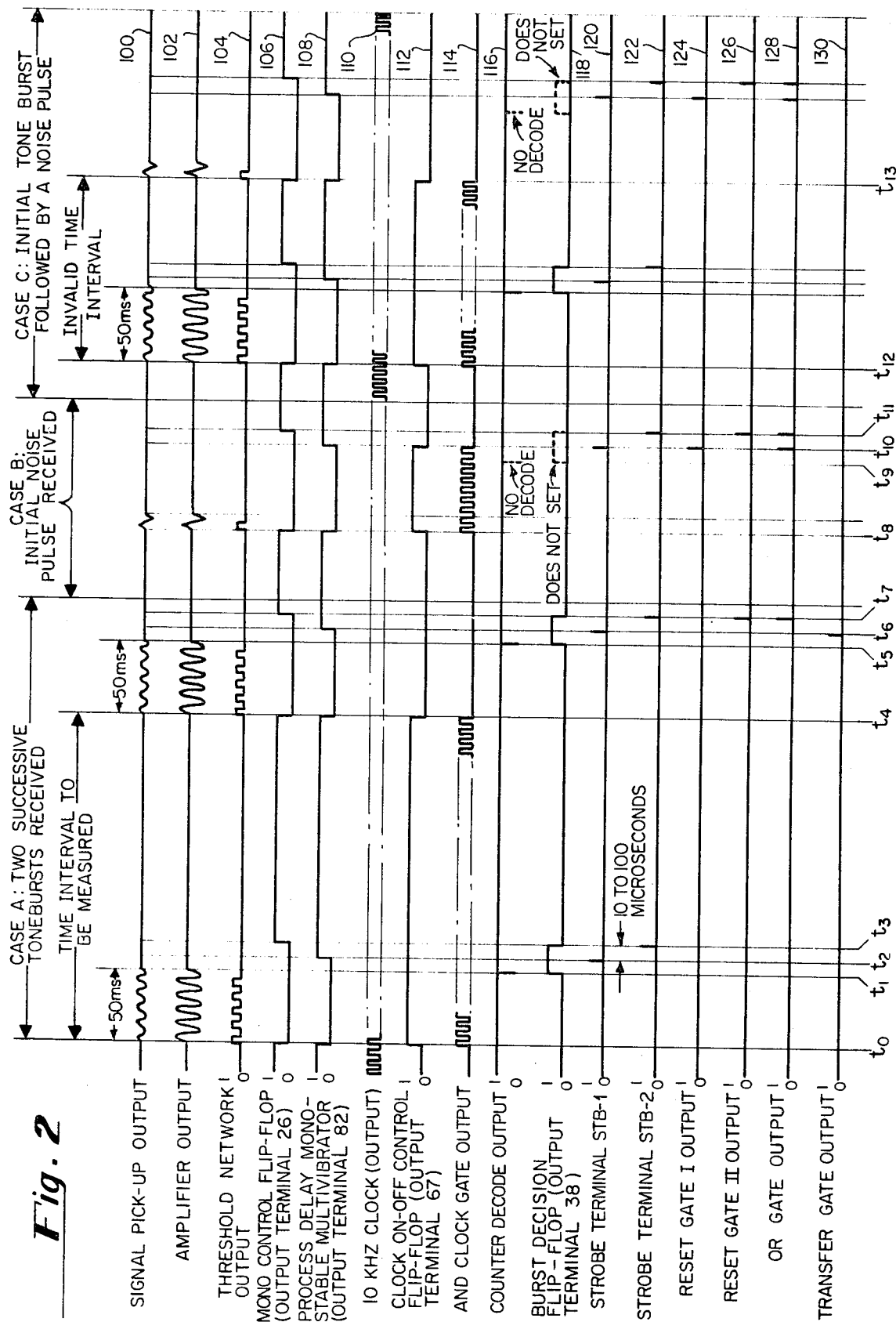
FIG. 2 is a timing diagram useful to explain the operation of the invention.

The Threshold Network 16 is essentially a device to convert the signals appearing on its input terminal 18 into a standardized pulse train of signals; see line 104 of FIG. 2. The Threshold Network 16 may, for example, comprise a Schmitt trigger circuit or any other suitable threshold device.

Signals emanating from the Threshold Network 16 appear at point 20 and are fed to two components of the receiver 10, namely, the Mono-Control flip-flop 22 and the Burst Pulse Counter 24. The flip-flop 22 is a set-reset type. It sets on the reception of the first pulse or signal emanating from the Threshold Network 16 and no further signals effect it until it is reset by the application of a signal on its reset terminal R. Accordingly, its function in the receiver 10 is to provide a signal on its output terminal 26 when the first signal of a train of signals from the threshold network 16 appears on its set or S terminal.

The Burst Pulse Counter 24 is a digital counter adapted to count the number of pulses in the trains of standardized pulses emanating from the Threshold Network, and, as will be explained more carefully hereinafter, after a predetermined count has been achieved, provide output signals via trunk line 28 to a counter Decode device 30. The Burst Pulse Counter 24 essentially performs the recognition or verification measuring process as will be explained more fully below.

The Decode device 30 essentially is a multiple input AND gate followed by an inverter constructed and arranged to provide an output decode signal when the Burst Pulse Counter 24 reaches the predetermined count programmed therein and applied the required input signals via trunk line 28 to the input side of the Decode device.

The output of the Decode device 30 is connected to the set terminal S of the Burst Decision flip-flop 32. The flip-flop 32 is the type that is set on the application of signals on its set terminal S and is reset on the application of a signal on its reset terminal R. The output terminal 34 of the flip-flop 32 is connected to the input terminal 36 of AND Reset Gate I. The output terminal 38 of the flip-flop 32 is connected to the input terminal 40 of the AND Transfer Gate 42. The output terminal 44 of gate 42 is connected to an input terminal 46 of the Storage Register and Readout Display device 50.

The AND Reset Gate I will provide an output signal on its output terminal 52 when both of its input terminal 36, 54 have the proper input signals applied thereto. The output signal at terminal 52 is applied to an input terminal 56 of the OR gate 58 and to the reset terminal R of the Clock On-Off Control flip-flop 60. The output terminal 62 of the OR gate is connected to the reset terminal of an Interval counter 64. The other input terminal 63 of OR gate 58 is connected to the output terminal 65 of an AND Reset Gate II.

The Clock On-Off Control flip-flop 60 is the type that toggles from one of its states to the other upon the application of a signal to its input terminal T. It can also be reset by the application of a signal to its reset terminal. The output terminal 67 of flip-flop 60 is connected to the input terminal 69 of AND clock gate 66. The output terminal 68 of flip-flop 60 is connected to an input terminal 70 of AND Reset Gate II and to an input terminal 72 of the Transfer Gate 42. The input terminal 74 of AND clock gate 66 is connected to a 10KHz Pulse Oscillator 76 sometimes hereinafter referred to as Clock 76.

The Pulse Oscillator 76 is the basic timing device of the receiver and is a pulse generator for providing a continuous pulsating signal at a preselected 10 KHz frequency to the input terminal 74 of the AND Clock Gate 66. With the proper signal applied to input terminal 69 of the AND Clock Gate 66, the Pulse Oscillator 76 will deliver a precise train of 10KHz pulses, via lead 71 to the Interval Counter 64 which is a digital counter adapted to count the pulses. When an output signal appears on the output terminal 44 of the AND Transfer Gate 42, the information or count in the Interval Counter 64 will be transferred to the Storage Register and Readout Display 50 via trunk line 98. The remaining functional components of the receiver 10 comprise the Process Delay Monostable Multivibrator 78 and the Strobe Generator 80.

As will become more apparent hereinafter, the ultimate function of the Process Delay Monostable Multivibrator 78, in the over-all scheme of the receiver, is to provide a delay in the measuring process performed by the receiver to allow sufficient time for the Burst Pulse Counter 24 to perform its verification or recognition measurement process. The output terminal 82 of the Process Delay Monostable Multivibrator 78 is connected to the input terminal T of the flip-flop 60 and the input terminal 84 of the Strobe Generator 80. The Strobe Generator 80 has two output terminals STB-1 and STB-2. The terminal STB-1 is connected to the input terminal 54 of AND Reset Gate I and to an input terminal 90 of the Transfer Gate 42. The terminal STB-2 is connected to the input terminal 92 of AND Reset Gate II and to the reset terminals of flip-flop 22, Burst Pulse Counter 24 and flip-flop 32.

Detailed Operation

The detailed operation of the receiver of the invention may best be understood by reference to FIG. 2. In FIG. 2, the waveforms shown on line 100 represent the signals at point 17. These waveforms are the output signals of the Signal Pick-up 12 and the input signals to the Amplifier 14. In case A, wherein two successive tone bursts are received, each waveform generally represents a signal characterized as having a predetermined number of pulsations and, specifically, in this example, each represents a 2KHz signal with a 50 ms duration. These would be representative of two intentionally transmitted audible signals transmitted over the telephone network and correspond to two successive output pulses of an implanted cardiac pacer. The time interval measured in case A represents a valid time interval measurement and is measured between the leading edges of the two waveforms. In case B, wherein a noise impulse is received, the waveform on line 100 represents such a noise impulse; as can be seen, the duration of the noise pulse is less than 50 ms in duration. In case C, on line 100 there is depicted a situation wherein an intentionally transmitted audible signal has been received corresponding to a pacer output pulse, and this is followed by a noise pulse. The time interval measured in case C represents an invalid time interval measurement as measured between the leading edges of the two waveforms. The lines designated 102 through 130 essentially represent timing diagrams for the various outputs of the components of the receiver 10 and those outputs that are indicated are labeled at the left-hand margin of FIG. 3. It will be noted that only waveforms of the output of one of the terminals in each of the flip-flops is shown, it being understood that other terminals of each flip-flop is the opposite to that depicted at any given time. As for example, in line 112, at time $t_0$, when the output terminal 67 is at a logic 1 level, the terminal 68 would be at ground level or logic 0.

Considering case A in FIG. 3, at time $t_0$, and beginning at line 104 with the standardized train of output pulse signals from the Threshold Network 16, the first pulse from the Threshold Network initiates two simultaneous processes. Parenthetically, the leading edge of his first pulse from the Threshold Network corresponds to the leading edge of a received intentionally transmitted tone burst. The first process is a time interval measurement process, and the second process is a verification or recognition measurement process. The first or time interval measurement process ceases with the reception of the next signal applied to the receiver and, in case A, the next signal received is another intentionally transmitted tone burst. The second or recognition measurement process essentially measures the duration of each received signal.

Beginning with the first measurement process, the first pulse from the Threshold Network 16, at time $t_0$, sets the Mono-Control flip-flop 22 (line 106 resulting in a logic 0 signal appearing on its output terminal 26 and this logic 0 signal is applied to the Process Delay Monostable Multivibrator 78. With the application of the logic 0 signal to the Process Delay Monostable Multivibrator 78, the Monostable Multivibrator 78 is tripped to provide a logic 0 signal (line 108) at point 82. The logic 0 signal at point 82 has no effect on the Strobe Generator 80 but does cause the Clock On-Off Control flip-flop 60 to toggle resulting in a logic 1 signal (line 112) to appear on its output terminal 67 and a logic 0 signal to appear on its output terminal 68. The logic 1 signal on output terminal 67 is applied to input terminal 69 of AND Clock Gate 66 thus enabling Clock Gate 66 (line 114). Accordingly, the Clock gate 66 permits the 10KHz Pulse Oscillator 76 (line 110) to begin registering a time interval in the Interval Counter 64, that is, the Interval Counter 64 beings to count the number of pulses passing through the Clock Gate 66. This counting of pulses from the Pulse Oscillator 76 continues until Clock Gate 66 is disabled.

As stated above, the second or recognition measurement process also begins with the first pulse from the Threshold Network. Beginning at time $t_0$, the first pulse and the succeeding pulses from the Threshold Network 16 (line 104) are applied to the Burst Pulse Counter 24. Each pulse in the train of pulses from the Threshold Network 16 is counted by the Burst Pulse Counter 24. If the counter 24 achieves a predetermined count which can be equated to a 50 ms interval, which it will in the current example as the first waveform received is in fact 50 ms in duration, then it provides appropriate output signals to the Decode unit 30 via trunk line 28 to cause the output of the Decode unit 30 to provide a logic 0 signal (line 116), at time $t_1$ to the set or S terminal of the Burst Decision flip-flop 32. When the Decode unit provides an output decode signal, the recognition measurement process in effect verifies that an intentionally transmitted tone burst has been received. A logic 0 signal on the S terminal of flip-flop 32 will cause it to set resulting in a logic 1 signal (line 118) at time $t_1$ to appear on its output terminal 38 and a logic 0 signal to appear on its output terminal 34. In this condition, the flip-flop 32 applies a logic 1 signal to the input terminal 40 of the AND Transfer Gate 42 and a logic 0 signal to the input terminal 36 of AND Reset Gate I These latter two gates are not enabled at this time due to the logic 0 signal appearing on the input terminal 36 of AND Gate I and due to the logic 0 signal provided by flip-flop 60 on its output terminal 68 which also appears on the input terminal 72 of the Transfer Gate 42. At time $t_2$, line 106, the Process Delay Monostable Multivibrator 78 times out resulting in a logic 1 signal appearing at point 22. It may be pointed out here that the Process Delay Monostable Multivibrator, when first activated remains in the condition such that it provides a logic 0 signal at point 82 for a predetermined length of time. Typically, this time delay may be approximately 80 ms when processing tone bursts 50 ms in duration. This delay, however, is arbitary and may be set depending upon other considerations such as the required time for the Burst Pulse Counter to perform the recognition measurement process. It may also be point out that while tone bursts of 2KHz with a 50 ms duration have been used in the examples herein, other tone bursts of different frequencies and of different duration may be transmitted to the receiver 10 and the receiver 10 may be adapted to process them in like manner to the examples given herein. As for example, 4KHz tone burst signals 25 ms in duration may be intentionally transmitted over the communication link and be coupled to the receiver 10; in this case, with each successive signal coupled to the receive 10, the Burst Pulse Counter 24 will achieve the predetermined count of 100 as it would with an intentionally transmitted 2KHz tone burst signal 50 ms in duration. From the foregoing, it will be understood that the signal verification process requires only that each of the intentionally transmitted signals being coupled to the receiver 10 have a predetermined number of pulsations and that the number of these pulsations be counted by the Burst Pulse Counter 24 which, after a predetermined count has been achieved, will provide an output signal to the Decode unit 30. In addition, it may be pointed out that the receiver 10 may also be constructed and arranged to be frequency selective so that only one preselected frequency having the proper number of pulsations will be accepted by the receiver 10. This may be accomplished by incorporating a narrow pass band frequency selective filter in the amplifier 14 which would pass signals only of the preselected frequency and reject all other. In this manner, the signal verification process will only process intentionally transmitted signals of the preselected frequency.

At time $t_2$, the transition of the Monostable Multivibrator 78 from a logic 0 level to a logic 1 level causes the Strobe Generator 80 to provide a strobe pulse or logic 1 signal (line 120) on its output terminal STB-1. This logic 1 signal is applied to the input terminal 54 of Reset Gate 1 with no effect due to the logic 0 signal appearing on its other input terminal 36, and to input terminal 90 of Transfer Gate 42 also with no effect due to the logic 0 signal appearing on its input terminal 72.

Because the Transfer Gate 42 is not enabled, the signal on its output terminal 44 at time $t_2$ is a logic 0. Thus, not transfer of data takes place at time $t_2$ nor is the Interval Counter reset.

After the first strobe pulse disappears, and after some arbitary short period of time, as for example 10 to 100 microseconds, a second strobe pulse is generated by the Strobe Generator 80 which appears on its output terminal STB-2 as a logic 1 signal (line 122 at $t_3$). The logic 1 signal on terminal STB-2 is applied to the input terminal 92 of AND Reset Gate II with no effect due to the logic 0 signal appearing on its other input terminal 70; to the reset terminals of the flip-flops 22 and 32 resetting them (lines 106 & 118); and to the reset terminal of the Burst Pulse Counter 24 resetting it in order that it may count the next train of pulses emanating from the Threshold Network 16.

The reception by the receiver 10 of the second tone burst, at time $t_4$, stops the time interval measurement process. This is accomplished, again beginning at line 104, by the reception of the first pulse from the Threshold Network 66 which, again, corresponds to the leading edge of the received intentionally transmitted tone burst. The first pulse from the Threshold Network 16, at time $t_4$, line 104, sets the Mono-Control flip-flop resulting in a logic 0 signal appearing on its output terminal 26 and this logic 0 signal is applied to the Process Delay Monostable Multivibrator 78. The application of the logic 0 signal to the Monostable Multivibrator 78 trips it to provide a logic 0 signal (line 108) at point 82. The logic 0 signal at point 82, again, has no effect on the Strobe Generator 80 but again, causes the flip-flop 60 to toggle resulting in a logic 0 signal, line 112, to appear on its output terminal 67 and a logic 1 signal to appear on its output terminal 68. The logic 0 signal on output terminal 67 is applied to input terminal 69 of Clock Gate 66 thus disabling Clock Gate 66. Consequently, the Clock Gate 66 no longer permits the Clock 76 to supply the clock pulses to the interval counter 64 (line 114). Thus, the time interval measurement ceases.

Also, at time $t_4$, the recognition measurement process begins again. The first pulse and the succeeding pulses from the Threshold Network 16 (line 104, at $t_4$) are applied to the Burst Pulse Counter 24. If the counter 24 achieves the predetermined count which can be equated to a 50 ms interval, which it again will in the current example as the second waveform received is in fact 50 ms in duration, then it provides appropriate output signals to the Decode unit 30 via trunk line 28 to cause the output of the Decode unit 30 to provide a logic 0 signal (line 116, at time $t_5$) to the set or S terminal of the Burst Decision flip-flop 32. Again, there has been a verification that an intentionally transmitted tone burst has been received. A logic 0 signal on the S terminal of flip-flop 32 will cause it to set resulting in a logic 1 signal (line 118, at time $t_5$) to appear on its output terminal 38 and a logic 0 signal to appear on its output terminal 34. In this condition, the flip-flop 32 applies a logic 1 signal to the input terminal 40 of Transfer Gate 42 and a logic 0 signal to the input terminal 36 of Reset Gate I. Again, these later two gates are not enabled at this time due to the logic 0 signal appearing on the input terminal 36 of AND Reset Gate I and due to the logic 0 signal appearing on the output terminal STB-1 of Strobe Generator 80 which is applied to input terminal 90 of the Transfer Gate 42. It will be noted, however, that at time $t_5$, the Transfer Gate 42 has two logic 1 signals applied to its input terminals; one due to the logic 1 signal now appearing on terminal 68 of flip-flop 60 and also appearing on input terminal 72 and the other appearing on its input terminal 40 due to the logic 1 signal appearing on output terminal 38 of flip-flop 32.

At time $t_6$, line 108, the Process Delay Monostable Multivibrator 78 times out resulting in a logic 1 signal appearing at point 82. The transition of the Monostable Multivibrator 78 from a logic 0 level to a logic 1 level again causes the Strobe Generator 80 to provide a logic 1 signal (line 120) on its output terminal STB-1. This logic 1 signal is applied to the input terminal 54 of Reset Gate I with no effect on Reset Gate I due to the logic 0 signal appearing on the input terminal 36 of Reset Gate I. It is also applied to the input terminal 90 of Transfer Gate 42, and, because of the logic 1 signals appearing on the other two input terminals of Transfer Gate 42, it passes through the Transfer Gate 42 resulting in a logic 1 signal appearing on the output terminal 44 of the Transfer Gate 42 (line 130) at time $t_6$.

The logic 1 signal appearing on output terminal 44 of Transfer Gate 42 also appears on the input terminal 46 of the Storage Register & Readout Display device 50 resulting in the transfer of time interval information thereto via trunk line 98 from the Interval Counter 64. The Storage Register and Readout Display device 50 will indicate either the time in milliseconds between the leading edges of the received intentionally transmitted tone bursts or provide directly an indication of the number of such burst per minute that are received.

From the foregoing it will be understood that the receiver 10, and in particular the Display Device of the Storage Register & Readout Display device 50, will provide information to an observer indicative of the output pulse repetition rate of a cardiac pacer when intentionally transmitted tone burst signals representing these pacer output signals are received thereby.

At time $t_7$, line 122, a second strobe pulse or logic 1 signal is again generated by the Strobe Generator 80 and appears at its output terminal STB-2. This logic 1 signal is applied to the reset terminal of flip-flop 32 causing its output terminal 38 to revert to a logic 0 level (line 118) and it is applied to flip-flop 22 causing its output terminal 26 to revert to a logic 1 (line 106). The logic 1 signal on terminal STB-2 is also applied to the input terminal 92 of AND Reset Gate II, and, because the other input terminal 70 of Reset Gate II has applied thereto a logic 1 signal from output terminal 68 of flip-flop 60, the strobe pulse passes through reset gate II resulting in a logic 1 signal appearing on its output terminal 65. The logic 1 signal on output terminal 65 is applied to input terminal 63 of the OR gate thus enabling the OR gate and resulting in a logic 1 signal to appear on its output terminal 62 (line 128) which in turn results in the Interval Counter 64 having a reset signal or logic 1 signal applied to the reset terminal thereof. The Interval Counter is thus ready to begin the tine interval measurement process anew upon the reception of the next received signal. It will be noted that from after time $t_7$, until the reception of the next signal at time $t_8$, the conditions that existed at time $t_0$ with respect to the various outputs of the various components of the receiver 10.

Considering now Case B of FIG. 2, wherein an initial noise pulse is received by the receiver 10 at time $t_8$, and beginning at line 104 with the train of pulses from the Threshold Network 16, the first pulse therefrom simultaneously begins the time interval measurement process and the recognition measurement process as in case A with the reception of the first tone burst signal. However, the count in the Burst Pulse Counter 24 never reaches the preprogrammed count as the noise signal is in fact no 50 ms in duration. Accordingly, no decode signal is ever provided to set the Burst Decision flip-flop 32 as is indicated by the dashed indications at time $t_9$, lines 116 and 118. In this situation, the output terminal 38 and the output terminal 34 of flip-flop 32 are, respectively, at logic 0 level (lines 118) and logic 1 level. This results in a logic 0 signal being applied to the input terminal 40 of Transfer Gate 42 and a logic 1 signal being applied to the input terminal of Reset Gate I. Consequently, at time $t_{10}$ when the Process Delay Monostable Multivibrator 78 times out (lines 108) resulting in the Strobe Generator providing the logic 1 signal on its STB-1 output terminal (line 120), the Transfer Gate 42 blocks the first strobe signal from passing therethrough and, therefore, time interval information is not transferred from the time Interval Counter 64 to the Storage Register & Readout Device. The first strobe signal does, however, pass through the Reset Gate I as the input terminal 36 thereof has applied thereto a logic 1 signal from the output terminal 34 of the flip-flop 32. The strobe pulse passing through Reset Gate I results in a logical 1 signal appearing on its output terminal 52; line 124 at time $t_{10}$. With a logic 1 signal appearing on output terminal 52, the input terminal 56 of the OR gate also has a logic 1 signal applied thereto resulting in a logic 1 signal (line 128, at time $t_{10}$) appearing on the output terminal of the OR gate which resets the Interval Counter. The time interval measurement process is thus aborted. The logic 1 signal appearing on output terminal 52 is also applied to reset terminal R of the flip-flop 60 resetting the same and resulting in the output terminal 67 thereof to revert to a logic 0 level; line 112 at $t_{10}$. This has the effect of isolating the 10KHz Pulse Oscillator 76 from the interval counter. It can be seen what has taken place so far in case B in no way has affected the information contained in the Storage Register and Readout Display device 50 and that no ambigious readings have resulted by the reception of the noise signal.

At time $t_{11}$, line 122, the second strobe pulse is generated by the Strobe Generator 80 resulting in a logic 1 signal appearing at its output terminal STB–2. This results in the Burst Pulse Counter 24 being reset and the flip-flop 22 resetting and reverting to the state wherein a logic 1 signal (line 106) appears on its output terminal 26. Also, the logic 1 signal appearing on the output terminal STB–2 appears at the R terminal of the flip-flop 32 but has no effect as the flip-flop 32 was never set, and it also appears at the input terminal 92 of AND Reset Gate II and passes through the Reset Gate II. In passing through Reset Gate II, it ultimately passes through the OR GATE (line 128) to the reset terminal of the Interval Counter 64, however, it has no effect in that the Interval Counter has already been reset. The functioning of the OR gate in this latter situation is merely redundant. The receiver after time $t_{11}$, again is at the conditions with respect to the various outputs thereof, as at time $t_0$.

Considering now Case C of FIG. 2 wherein the first signal is an intentionally transmitted signal which is followed by a noise pulse, the operation of the receiver 10, upon the reception of the first tone burst at time $t_{12}$, is the same as in Case A upon the reception of the first tone burst at time $t_0$. Upon the reception of the noise pulse at time $t_{13}$, the operation of the receiver 10 is essentially the same as in Case B upon the reception of the noise pulse at time $t_8$. Although the operation of the receiver 10 has not been set forth in detail in Case C, the steps are shown in the timing diagram and may be readily understood with reference to the detailed explanation of the steps of operation of the receiver 10 set forth in Cases A and B.

From the foregoing, it will be understood that the described receiver 10 continually sifts through all received signals to find two successive intentionally transmitted tone burst signals without any intervening noise from which to derive a valid time interval measurement. Stated another way, the implementation of the receiver 10 described is such that valid time interval information is derived between the leading edges of the first and second tone burst signal; between the leading edges of the third and fourth, etc. Valid time interval information could easily be derived from between the trailing edges or from between the first and second tone burst, the second and third tone burst, the third and fourth tone burst, etc. In the latter situation, however, the actual implementation of the receiver would be more complex and costly.

It should also be understood that each of the components shown in block form in FIG. 1 can be readily implemented with commercially available microcircuit components. Further, while the description of the implementation of the receiver 10 has been presented in terms of AND-OR logic, the receiver 10 can easily be implemented or converted to NAND -NOR logic circuit elements which are most readily available comercially. The con-version can be easily accomplished through standard techniques of logic circuit design. Thus, one can form the logical AND function with two NAND gates.

Examples of the components illustrated in FIG. 1 are set forth in the table below:

| Circuit | Commercial Type |
| --- | --- |
| Amplifier 14 | Fairchild Semiconductor 741 operational amplifier |
| Threshold Network 16 | Texas Instrument Inc. Schmitt Trigger, SN 7413 |
| Process Delay Monostable Multivibrator | Fairchild Semiconductor 9601 Retriggerable Monostable Multivibrator |
| Flip-flops 22, 60, 32 | Signetics Corp. N 8822 A |
| Burst Pulse Counter 24 | 2-Signetics Corp. N 8281 A |
| Decode 30 | Signetics Corp. 8808 A |
| Strobe Generator 80 | 3-Fairchild Semi-conductor 9601 Retriggerable Monostable Multivibrator |
| Interval Counter 64 | 5-Signetics Corp. 8280 A Decode Counters |
| Storage Register | Luminetics Corp. 5916 Decade Driver with Memory |
| Readout Display 50 | Luminetics Corp. series 20 |
| 10KHz Pulse Oscillator | Accutronics Inc. KK–82–28P |

Having thus described our invention, we claim:

1. Receiver apparatus adapted to have coupled thereto successive signals each being characterized as having a predetermined number of pulsations and, at times, noise signals comprising:
  a. first means for measuring the time interval between successive signals coupled to the receiver, and
  b. signal verification means for verifying that each signal coupled to the receiver is either a signal having a predetermined number of pulsations or a noise signal and for aborting measurements of the first means when a noise signal is coupled to the receiver.

2. Receiver apparatus as defined in claim 1 wherein the first means includes:
  a. pulse generating means for providing a continuous pulsating signal at a preselected frequency, and
  b. counter for counting the continuous pulsations of the pulse generating means.

3. Receiver apparatus as defined in claim 2 wherein the signal verification means is operable in response to each signal being coupled to the receiver for verifying that each signal coupled to the receiver is either a signal having a predetermined number of pulsations or a noise signal, and for stopping the operation and resetting the counter when a noise signal is coupled to the receiver.

4. Receiver apparatus as defined in claim 3 including means operable in response to successive signals being coupled to the receiver to alternately start and, unless the operation of the counter is stopped and reset by the signal verification means, to stop the counting of the continuous pulsations of the pulse generating means whereby the count registered in the counter between each starting and each stopping of the counter not effected by the signal verification means is indicative of the time interval between each two successive signals having a predetermined number of pulsations coupled to the receiver.

5. Receiver apparatus as defined in claim 4 including
   a. display means, and
   b. means controlled by the signal verification means for effecting the transfer to the display means of the count registered in the counter between each starting and each stopping of the counter not effected by the signal verification means whereby to provide to an observer information indicative of the time interval between each two successive signals having a predetermined number of pulsations coupled to the receiver.

6. A receiver apparatus adapted to have coupled thereto signals which are transmitted over a communication link, the signals including intentionally transmitted signals of preselected frequency and duration and, at times, noise signals which are introduced into the communication link, and being constructed and arranged to continually sift through all received signals coupled thereto to locate each two successive intentionally transmitted signals without any intervening noise signals therebetween for providing information indicative of the time interval between each such two successive intentionally transmitted signals, the receiver apparatus comprising:
   a. means for providing a continuous pulsating signal at a preselected frequency,
   b. a digital counter for counting the pulsations of the pulsating signal,
   c. signal verification means operable in response to each signal being coupled to the receiver for verifying that each coupled signal is either an intentionally transmitted signal or a noise signal, and for stopping the operation and resetting the counter when a noise signal has been coupled to the receiver, and
   d. means operable in response to successive signals being coupled to the receiver to alternately start and, unless the operation of the counter is stopped and reset by the signal verification means, to stop the counting of the pulsations of the pulsating signal whereby the count registered in the counter between each starting and each stopping of the counter not effected by the signal verification means is indicative of the time interval between each two successive intentionally transmitted signals coupled to the receiver.

7. A receiver as defined in claim 6 wherein the signal verification means includes:
   a. threshold network means for converting each signal coupled to the receiver into a standardized train of pulses, each train of pulses substantially corresponding in time duration to the duration, in time, of each signal coupled to the receiver, and
   b. a second digital counter operatively connected to the threshold network for counting the pulses of each standardized train of pulses.

8. A receiver as defined in claim 7 including means controlled by the second digital counter for resetting the first named counter if a predetermined number of pulses in a train of pulses are not counted by the second digital counter and for inhibiting the resetting of the first named counter if a predetermined number of pulses in a train of pulses are counted by the second digital counter.

9. Receiver apparatus as defined in claim 6 including:
   a. display means, and
   b. means controlled by the signal verification means for effecting the transfer to the display means of the count registered in the counter between each starting and each stopping of the counter not effected by the signal verification means whereby to provide to an observer information indicative of the time interval between each two successive intentionally transmitted signals coupled to the receiver.

* * * * *